US008417116B2

(12) United States Patent
Kim et al.

(10) Patent No.: US 8,417,116 B2
(45) Date of Patent: Apr. 9, 2013

(54) ROF SYSTEM PROVIDING HD WIRELESS COMMUNICATION SERVICE AND SIGNAL CONTROL METHOD FOR THE SAME

(75) Inventors: Sang-Ho Kim, Suwon-si (KR); Seong-Taek Hwang, Pyeongtaek-si (KR); Yun-Je Oh, Yongin-si (KR); Byung-Jik Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1012 days.

(21) Appl. No.: 12/074,999

(22) Filed: Mar. 6, 2008

(65) Prior Publication Data

US 2008/0219670 A1 Sep. 11, 2008

(30) Foreign Application Priority Data

Mar. 6, 2007 (KR) ........................ 10-2007-0022110

(51) Int. Cl.
*H04B 10/00* (2006.01)
*H04B 10/24* (2006.01)

(52) U.S. Cl.
USPC ............................................ 398/41; 398/115

(58) Field of Classification Search .................. 398/115, 398/41, 52; 455/561, 562.1, 553.1
See application file for complete search history.

(56) References Cited

U.S. PATENT DOCUMENTS

| 5,933,421 A | 8/1999 | Alamouti et al. | |
| 6,212,172 B1 | 4/2001 | Barabash et al. | |
| 7,149,527 B2 * | 12/2006 | Chen et al. | 455/452.1 |
| 7,660,531 B2 * | 2/2010 | Lee et al. | 398/115 |
| 8,041,222 B2 * | 10/2011 | Lee et al. | 398/115 |
| 8,059,963 B2 * | 11/2011 | Kim et al. | 398/115 |
| 2001/0021178 A1 * | 9/2001 | Barabash et al. | 370/277 |
| 2002/0016183 A1 * | 2/2002 | Lehtinen | 455/553 |
| 2004/0203786 A1 * | 10/2004 | Ishiguro et al. | 455/436 |
| 2004/0264393 A1 * | 12/2004 | Desgagne et al. | 370/294 |
| 2006/0077931 A1 * | 4/2006 | Lee et al. | 370/329 |
| 2007/0147273 A1 * | 6/2007 | Lee et al. | 370/280 |
| 2007/0258432 A1 * | 11/2007 | Lee et al. | 370/347 |
| 2008/0056167 A1 * | 3/2008 | Kim et al. | 370/294 |

* cited by examiner

*Primary Examiner* — Nathan Curs
*Assistant Examiner* — Tanya Ngo (57) ABSTRACT

Disclosed is an RoF system providing an HD wireless communication service. The RoF system includes the base station for transmitting and receiving each of the TDD/FDD individual signals and TDD/FDD combined signals, channel-combining downstream signals for a TDD scheme with downstream signals for an FDD scheme, and generating TDD/FDD mode control signals; a base station donor for receiving downstream RF signals from the base station, converting the resultant signals into downstream optical signals, outputting the converted signals, and delivering upstream optical signals, which are input to the remote station from the wireless terminals, to the base station; and the remote station for switching a corresponding duplexing mode operation according to wireless service channel states of the wireless terminals, converting the downstream optical signals transmitted from the base station donor into service RF signals, amplifying the converted service RF signals, and providing the amplified service RF signals to the wireless terminals through antennas.

20 Claims, 8 Drawing Sheets

ROF SYSTEM PROVIDING HD WIRELESS COMMUNICATION SERVICE AND SIGNAL CONTROL METHOD FOR THE SAME

CROSS-REFERENCE TO RELATED APPLICATION(S) AND CLAIM OF PRIORITY

The present application claims the benefit under 35 U.S.C. §119(a) of an application entitled "RoF System Providing HD Wireless Communication Service and Signal Control Method for the same" filed in the Korean Industrial Property Office on Mar. 6, 2007 and assigned Serial No. 2007-22110, the contents of which are hereby incorporated by reference.

TECHNICAL FIELD OF THE INVENTION

The present application relates generally to a wireless communication system, and more particularly to a communication system that improves flexibility of resource assignment and maximizes system performance by a Radio over Fiber (RoF) system, and that accepts a wireless communication service of a Hybrid Duplexing (HD) scheme for either individually applying a Time Division Duplexing (TDD) transmission scheme and a Frequency Division Duplexing (FDD) transmission scheme or applying a combined transmission scheme thereof according to positions of wireless terminals.

BACKGROUND OF THE INVENTION

With the development of the wireless communication industry, various wireless communication schemes have been proposed. In addition to the existing mobile communication network supporting a specific wireless communication scheme, it is possible to implement a mobile communication network supporting a wireless communication scheme different from the existing wireless communication scheme.

Therefore, the advent of a wireless environment, which includes the mixed mobile communication networks supporting different wireless communication schemes between them, is expected.

In such a wireless environment, it is necessary for mobile users to select and use a proper wireless communication scheme according to a wireless condition.

In line with this, a 3rd generation wireless communication system has been developed to perform high-speed and large capacity data communication as well as existing voice communication.

The 3rd generation wireless communication systems can be divided into systems of two standardization organizations, which include a 3rd Generation Partnership Project (3GPP), which is a European asynchronous standardization organization, and a 3rd Generation Partnership Project 2 (3GPP2), which is a synchronous standardization organization of the US. A typical scheme which is being discussed in the 3GPP organization is a Wideband Code Division Multiple Access (hereinafter, referred to as WCDMA) scheme, and a typical scheme which is being discussed in the 3GPP2 organization is a Code Division Multiple Access (hereinafter, referred to as CDMA) scheme.

The WCDMA scheme can be reclassified into WCDMA using the FDD scheme and WDCMA using the TDD scheme.

Figure 1:
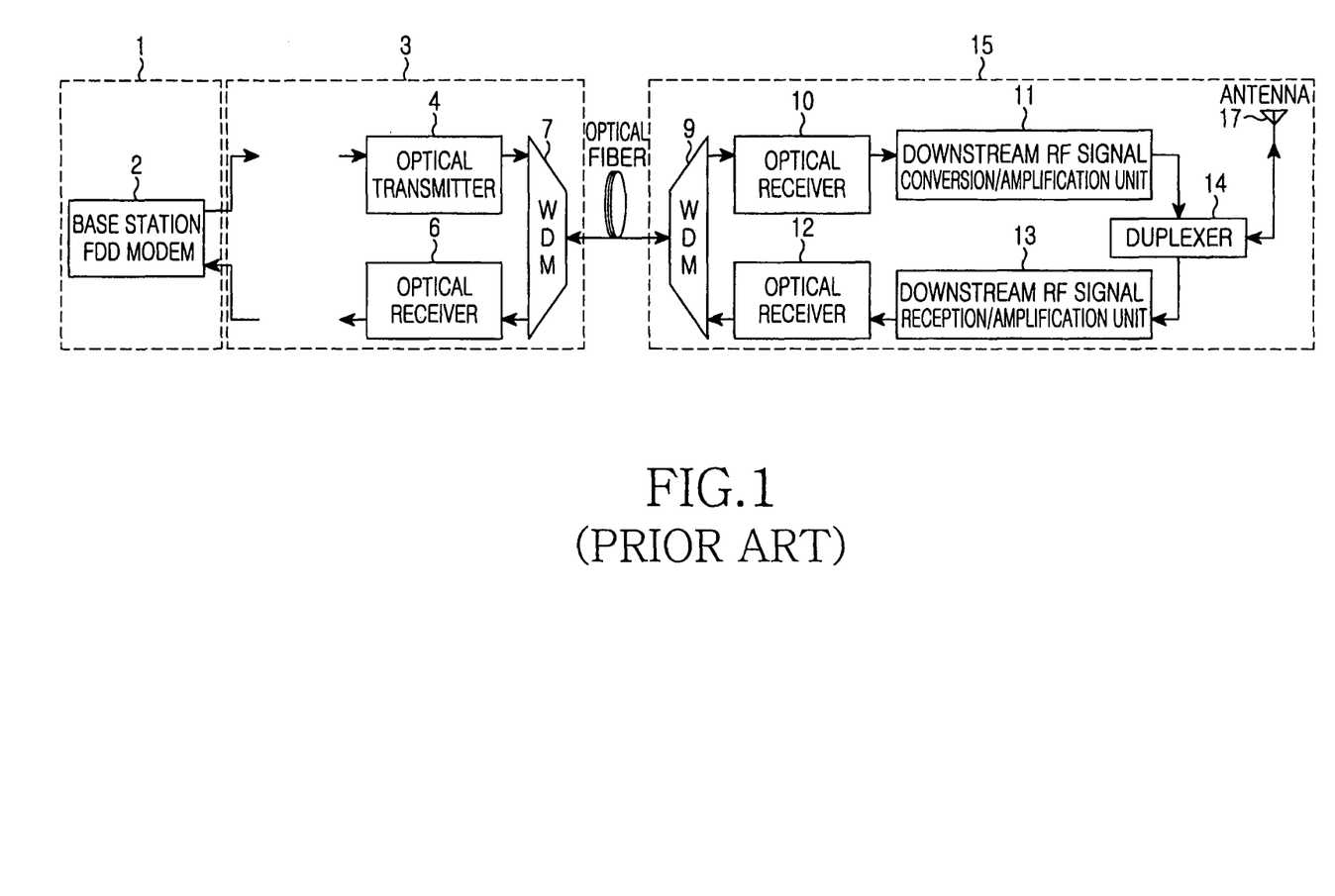
FIG. 1 is a block diagram illustrating a construction of a wire relay system in an FDD wireless communication service system according to the prior art.

FIG. 1 is a block diagram illustrating a wire relay system of a conventional FDD wireless communication service system according to one embodiment. Referring to FIG. 1, the FDD is a scheme in which transmission and reception for communication are performed based on divided frequencies. First, RF downstream signals modulated in an FDD modem 2 of a Base Station (BS) 1 are converted into optical signals in a base station donor 3, and then the converted signals are delivered to the Remote Station (RS) 15 via an optical fiber by an optical transmitter 4. The downstream optical signals received from the base station donor 3 are input to a downstream RF signal conversion/amplification unit 11 by an optical receiver 10, and the input signals are delivered to wireless terminals via a duplexer 14 and an antenna 17.

Then, an FDD wireless communication service is performed. Upstream signals generated by the wireless terminals are input to a duplexer 14 of the RS 15 through an antenna 17 for frequency division. Then, the frequency-divided signals are amplified in a downstream RF signal reception/amplification unit 13, the amplified signals are input to the optical receiver 6 of the base station donor 3 via an optical receiver 12 and an optical fiber, and the resultant signals are input to the FDD modem 2 of the BS 1.

Figure 2:
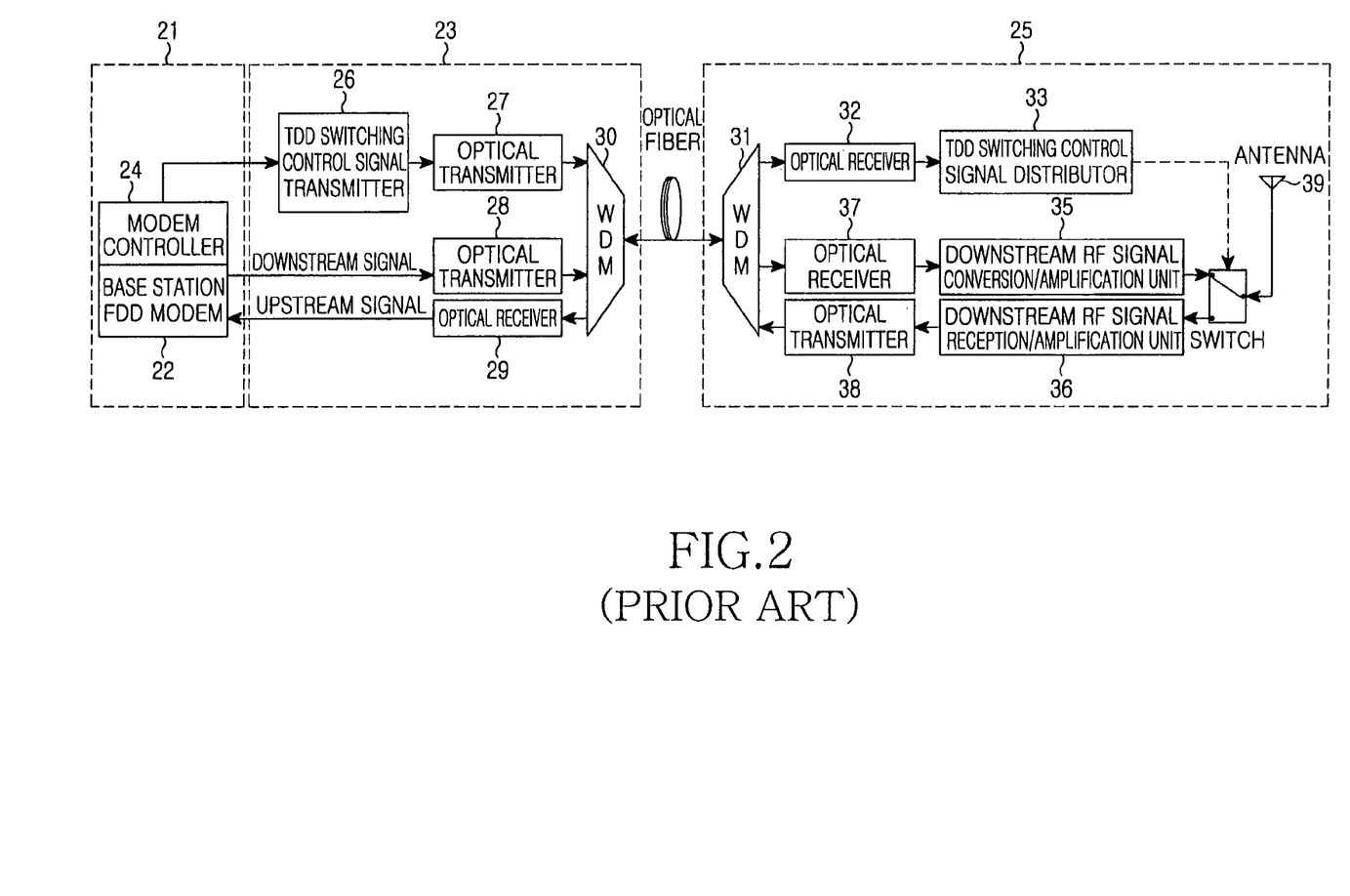
FIG. 2 is a block diagram illustrating a construction of a wire relay system in a TDD wireless communication service system according to the prior art.

FIG. 2 is a block diagram illustrating a wire relay system of a conventional TDD wireless communication service system according to one embodiment. As shown in FIG. 2, the TDD is a scheme in which transmission and reception are divided according to different times and communication is performed. First, RF downstream signals modulated in a TDD modem 22 of a BS 21 are delivered to an optical transmitter 28 of a base station donor 23, and TDD sync signals from the TDD modem 22 are delivered to a TDD switching control transmitter 26 of the base station donor via a modem controller 24.

The TDD switching control transmitter 26 generates TDD switching control signals for switching the TDD sync signals at predetermined time, and the TDD switching control signals are converted into downstream optical signals, and the resultant signals are transmitted to the RS 25 through an optical transmitter 27. The optical receiver 32 of the RS 25 receives the downstream optical signals, the resultant signals are output by a TDD switching control signal distributor 33, and switching is performed according to the TDD switching control signals at corresponding times. Then, the TDD transmission scheme downstream signals received in an optical receiver 37 of the RS 25 are converted into RF signals, and the resultant signals are amplified. Therefore, the TDD transmission scheme service is provided to the wireless terminals through the antenna 39. In this case, for each wireless terminal receiving the provided TDD transmission scheme service, the times for downlink and uplink transmission and reception have been predetermined.

Accordingly, the wireless terminals and the BS perform communication within the predetermined times. In this case, the BS may assign some or all of the available time slots to wireless terminals performing communication.

As such, according to the FDD transmission scheme, frequencies for downlink and uplink transmission and reception between the BS and the wireless terminals are individually set, and the communication between wireless terminals and a BS is performed based on the set frequencies at all time.

Accordingly, an FDD scheme is suitable for use of macrocell because it does not have a round-trip delay problem. The FDD scheme can provide a service suitable for a rapidly moving terminal due to a large cell radius.

On the other hand, in the FDD scheme, frequency bandwidths are symmetrical and are fixedly allocated. Therefore, the FDD scheme is limited in providing a variable asymmetric service.

Further, according to the TDD scheme, different time slots are assigned to uplink and downlink established between a BS and a specific wireless terminal. Therefore, the TDD scheme is suitable for provision of an asymmetric service. However, in the TDD scheme, when a cell radius becomes large, a guard time between transmission and reception increases due to the round-trip delay and thus transmission efficiency is reduced.

Therefore, the TDD scheme is not suitable for a cell with a large radius, such as a macro-cell, and each cell does not have an identical asymmetry rate under the multiple cell environments in the TDD scheme. Therefore, in the TDD scheme, the same frequency interference increases between terminals located in edges of adjacent cells.

Accordingly, a next generation wireless communication service requires a high-speed data rate to be provided to rapidly moving terminals, so that it is necessary to research a system utilizing the advantages of TDD and FDD scheme.

SUMMARY OF THE INVENTION

To address the above-discussed deficiencies of the prior art, it is a primary object to provide an RoF system providing an HD wireless communication service and a signal control method for the same in a wireless mobile communication system, by which it is possible to perform a wire relay of a wireless communication system capable of employing all required duplexing transmission schemes according to the channel state of a wireless service.

In one embodiment, a wireless network is disclosed for providing hybrid duplexing wireless service. The wireless network comprises a plurality of base station, wherein each of the base stations communicates with each of a plurality of wireless terminals using a selected one of: i) a time division duplexing (TDD) service; ii) a frequency division duplexing (FDD) service; and iii) a TDD/FDD combined service. Advantageously, the each base station selects the selected one of the TDD service, the FDD service and the TDD/FDD combined service to communicate with a first one of the plurality of wireless terminals according to a state of a wireless channel associated with the first wireless terminal.

In accordance with an aspect of the present invention, there is provided an RoF system for providing an HD wireless communication service in a wire/wireless communication system including a Base Station (BS) capable of establishing communication with wireless terminals and a Remote Station (RS) connected to the BS through an optical fiber, wherein the BS can provide a Time Division Duplexing (TDD) service and a Frequency Division Duplexing (FDD) service according to wireless service channel states of the wireless terminals, the RoF system including: the BS for transmitting and receiving each of the TDD/FDD individual signals and TDD/FDD combined signals, channel-combining downstream signals for a TDD scheme with downstream signals for an FDD scheme, and generating TDD/FDD mode control signals; a base station donor for receiving downstream RF signals from the BS, converting the resultant signals into downstream optical signals, outputting the converted signals, and delivering upstream optical signals, which are input to the RS from the wireless terminals, to the BS; and the RS for switching a corresponding duplexing mode operation according to wireless service channel states of the wireless terminals, converting the downstream optical signals transmitted from the base station donor into service RF signals, amplifying the converted service RF signals, and providing the amplified service RF signals to the wireless terminals through antennas.

In accordance with another aspect of the present invention, there is provided a signal transmission control method in a wire/wireless communication system including a BS capable of establishing communication with wireless terminals, a base station donor, and an RS connected to the base station donor through optical fibers, wherein the BS can provide a TDD transmission service and an FDD transmission service according to wireless service channel states of the wireless terminals, the signal transmission control method including the steps of: disconnecting switching of FDD upstream signal paths according to the control of the TDD/FDD mode control signals of the RS, and connecting switching of TDD upstream signal paths according to the control of the TDD switching control signals of the RS, when TDD upstream signals are received from the wireless terminals through an antenna of the RS; and delivering the TDD upstream signals passed through the TDD upstream signal paths to the first base station receiver of the BS via the base station donor and upstream optical links.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 4 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication network.

The present invention provides an RoF system providing a hybrid duplexing (HD) wireless communication service and a signal control method for the same. According to the present invention, a base station can efficiently deal with both a wireless communication service provided according a combined TDD/FDD transmission scheme and a wireless mobile communication service provided according to an individual duplexing scheme. Therefore, it is possible to simplify the construction of the base station and the remote station and to reduce manufacturing cost.

Figure 3:
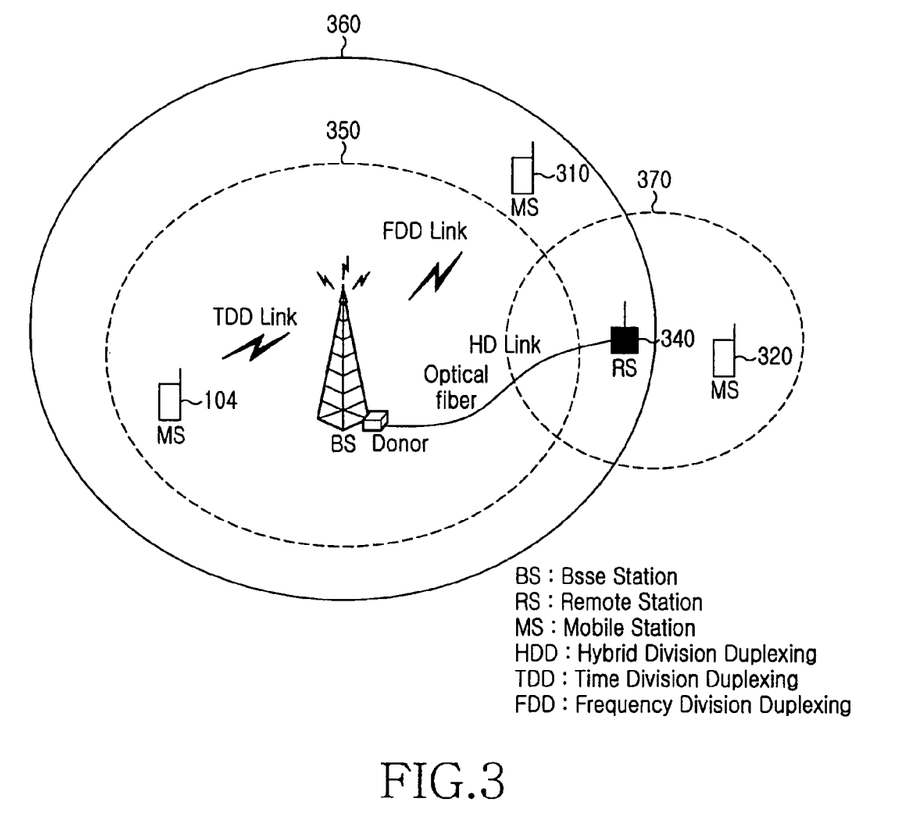
FIG. 3 is a view illustrating an RoF system to which an HD scheme is applied, according to one embodiment of the present invention.

In line with this, FIG. 3 is an exemplary view of a radio-over-fiber (RoF) system to which a hybrid duplexing (HD) scheme is applied, according to a first embodiment of the present invention. As shown in FIG. 3, a base station (BS) logically has two cell radiuses 350 and 360, and a service mobile terminal 104 located relatively nearer to the base station antenna has a good wireless channel state and thus has a high probability to receive a broadband data service. Therefore, the service mobile terminal 104 can receive a service by resource assignment of a TDD link advantageous for such a service. However, in a case of a mobile terminal 310 located within a cell 360 relatively far from the base station antenna, it is advantageous to receive a service through FDD links because the round-trip time delay problem occurs much less. That is, it can be said that a broadband TDD mode is relatively advantageous to the mobile terminal 104 relatively nearer to the base station antenna, whereas a narrowband FDD mode is advantageous to the mobile terminal 310 located in a place relatively farther from the base station antenna. However, in a remote station (RS) 340 connected to the base station (BS) by an optical fiber link, a mobile terminal 320, located within a distance in which wireless service signals can be transmitted and received through an antenna of the remote station 340, is in need of HD link connection including the combined TDD and FDD transmission schemes, as well as connection through duplexing link using either a TDD transmission scheme or an FDD transmission scheme.

Figure 4:
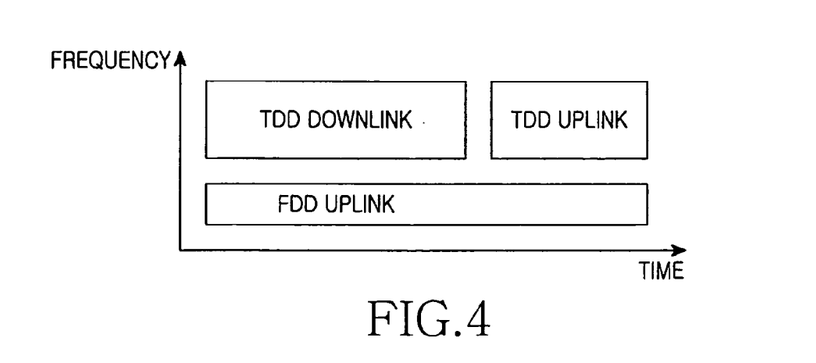
FIG. 4 is an exemplary view illustrating a channel construction of an RoF system to which an HD scheme is applied, according to a first embodiment of the present invention.

FIG. 4 is an exemplary view illustrating a channel construction of an improved hybrid duplexing (HD) system, according to the present invention. In the present invention, all system frequency resources are divided into two frequency bandwidths, so that the two divided frequency bandwidths can used as channels having different duplexing characters.

As shown in FIG. 4, given frequency resources are divided into two TDD channels providing uplink and downlink and one FDD channel providing only uplink.

Figure 5:
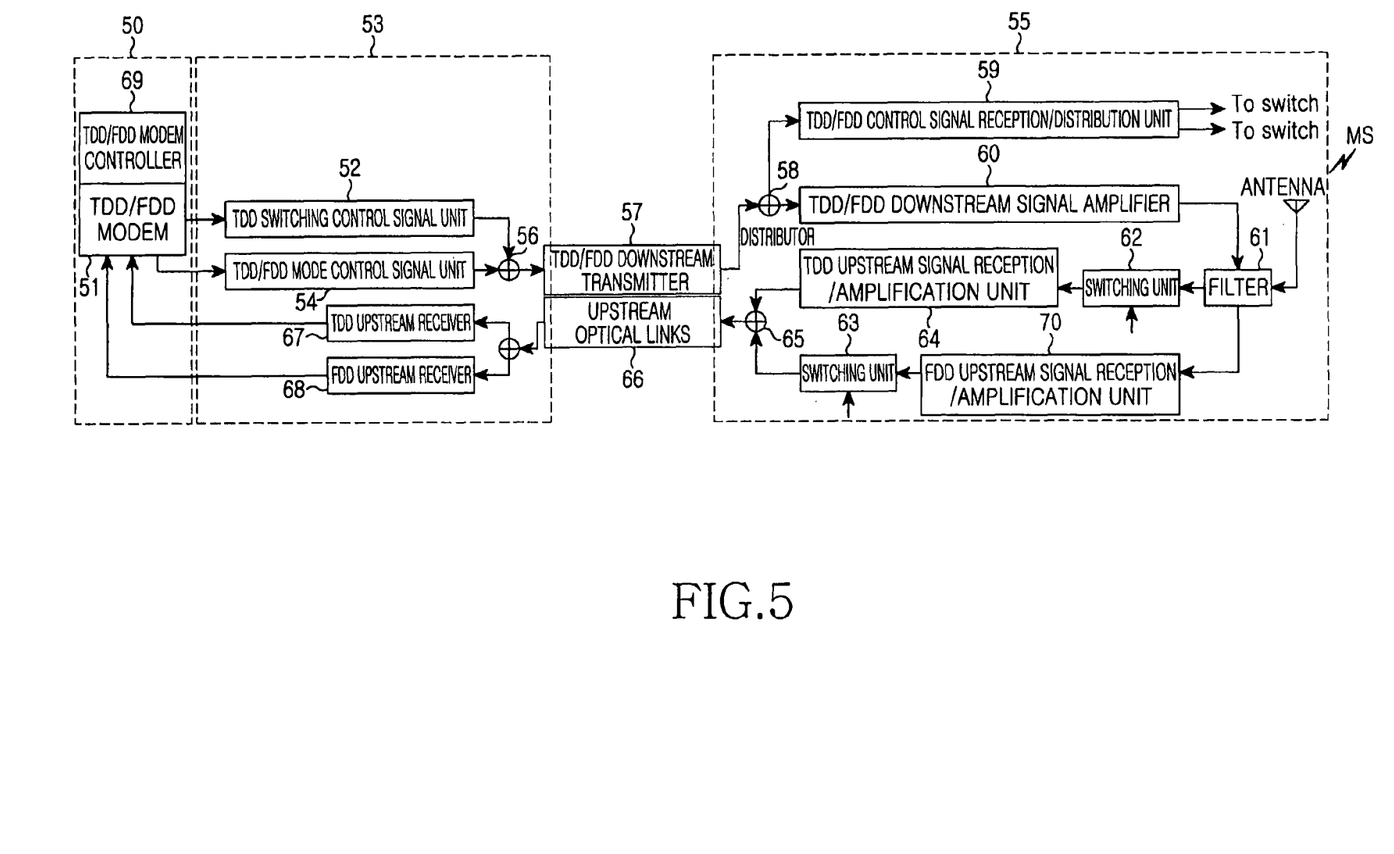
FIG. 5 is a block diagram illustrating a construction of an RoF system operating through an HD scheme according to one embodiment of the present invention.

FIG. 5 is a block diagram illustrating a construction of an HD wireless communication system according to one embodiment of the present invention. Referring to FIG. 5, the wireless communication system according to one embodiment of the present invention includes a BS 50, a base station donor 53, upstream/downstream optical links 57 and 66, and an RS 55.

The BS 50 includes a TDD/FDD modem 51 and a TDD/FDD modem controller 69. Herein, the TDD/FDD modem 51 modulates and demodulates each of TDD downstream RF signals, FDD downstream RF signals, and HD downstream RF signals, and it channel-combines downstream signals for TDD scheme with downstream signals for FDD scheme. Herein, the TDD/FDD modem controller 69 controls a TDD/FDD mode signal operation by using signals output from the TDD/FDD modem 51. Herein, mode control signals of the TDD/FDD downstream signals correspond to mode control signals of a TDD transmission scheme, mode control signals of an FDD transmission scheme, or mode control signals of an HD transmission scheme, the HD transmission scheme resulting from combination of the TDD and FDD transmission schemes.

The base station donor 53 includes a TDD/FDD mode control signal unit 54, a TDD switching control signal unit 52, a TDD/FDD downstream transmitter 57, a combiner 56, a TDD upstream receiver 67, and an FDD upstream receiver 68. Herein, the TDD/FDD mode control signal unit 54 receives downstream RF signals transmitted from the BS 50 and outputs TDD/FDD mode control signals for setting a TDD/FDD mode. Herein, the TDD switching control signal unit 52 outputs TDD switching control signals for switching the TDD sync signals from among downstream RF signals transmitted from the BS 50. Herein, the TDD/FDD downstream transmitter 57 converts RF signals corresponding to one of TDD/FDD downstream signals mode control signals, transmitted from the BS 50, into optical signals, and then outputs the resultant signals, the TDD/FDD downstream signals mode control signals including mode control signals of a TDD transmission scheme, mode control signals of an FDD transmission scheme, and mode control signals of a HD transmission scheme. Herein, the combiner 56 multiplexes and outputs signals output from each of the TDD/FDD mode control signal unit 54, the TDD switching control signal unit 52, and the TDD/FDD downstream transmitter 57. Herein, the TDD upstream receiver 67 and the FDD upstream receiver 68 deliver the upstream signals received from the RS to the BS.

The RS 55 includes a distributor 58, a TDD/FDD control signal reception/distribution unit 59, a TDD/FDD downstream signal amplifier 60, a filter 61, switching units 62 and 63, a TDD upstream signal reception/amplification unit 64, an FDD upstream signal reception/amplification unit 70, and a distributor 65. Herein, the distributor 58 receives TDD/FDD mode control signals and TDD/FDD downstream signals, received from the base station donor 53 through the TDD/FDD downstream optical links, and then distributes the received signals to respective paths. Herein, the TDD/FDD control signal reception/distribution unit 59 switches the TDD/FDD mode control signals, received from the distributor 58, according to the set mode, and the TDD/FDD control signal reception/distribution unit 59 divides the resultant signals according to frequencies with different bandwidths and delivers the divided signals to the antenna. Herein, the TDD/FDD downstream signal amplifier 60 amplifies the TDD/FDD downstream signals received from the distributor 58, and the filter 61 separates each of the TDD/FDD upstream signals, which are received from the antenna, according to a corresponding path. Herein, the switching units 62 and 63 control switching according to the mode, and the TDD upstream signal reception/amplification unit 64 and the FDD upstream signal reception/amplification unit 70 are controlled by the switching units 62 and 63. Herein, the distributor 65 combines upstream signals delivered from each of the TDD upstream signal reception/amplification unit 64 and the FDD upstream signal reception/amplification unit 70, and then delivers the resultant signals to the TDD/FDD upstream optical links.

Figure 6:
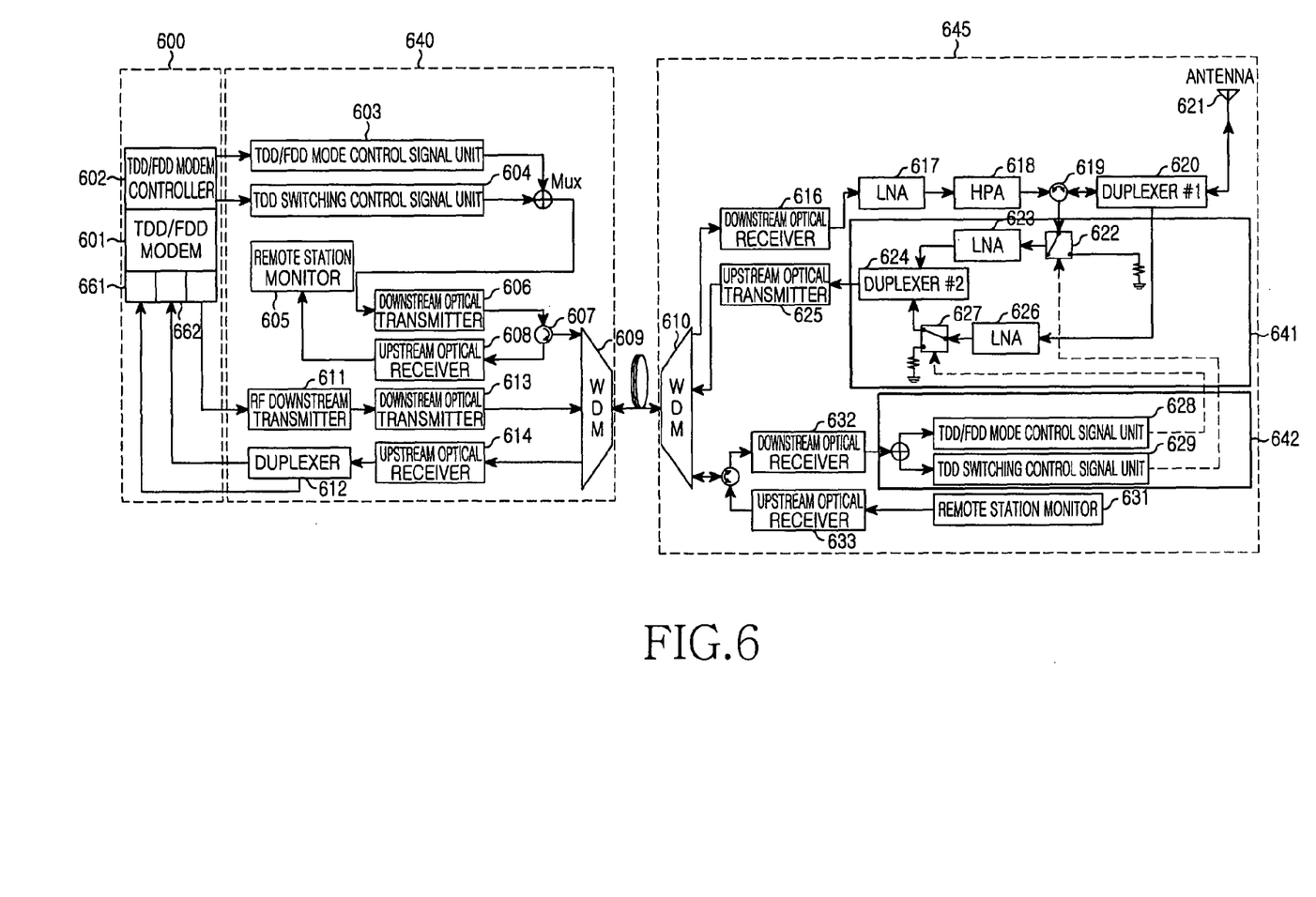
FIG. 6 is a block diagram illustrating a construction of a wireless communication system operating in an HD mode including the combined TDD and FDD mode, according to a first embodiment of the present invention.

FIG. 6 is a block diagram illustrating a construction of a wireless communication system operating in an HD mode including the combined TDD and FDD mode, according to a first embodiment of the present invention. Referring to FIG. 6, when upstream RF signals received from the wireless terminals through an antenna 621 of the RS 645 correspond to an HD mode upstream signals, the TDD upstream signals are input to a switching unit 622 through an RF duplexer #1 620 after direction-adjustment of a circulator 619. The switching unit 622 is connected to a corresponding path of the TDD upstream signals according to the control of the TDD switching control signal unit 629, and the resultant signals are input to a Low Noise Amplifier (LNA) 623 for low noise-amplification. The FDD upstream signals are also input to an LNA 626 through the RF duplexer #1 620 for low noise-amplification, and the resultant signals are switched according to the control of the TDD/FDD mode control signal unit 628.

Then, each of the low-noise amplified TDD/FDD signals is mixed in a duplexer #2 624, and the mixed signals are upwardly delivered to the base station donor 640 by an upstream optical transmitter 625. The TDD/FDD upstream signals received from the RS 645 through the upstream optical link are input to the upstream optical receiver 614. Since the TDD/FDD upstream RF signals have different frequency bandwidths, each of the TDD/FDD upstream RF signals is divided according to frequencies by the duplexer 612, and the divided signals are delivered to the BS 600 through a first upstream RF receiver and a second upstream RF receiver.

Meanwhile, the TDD RF upstream signals and the FDD RF upstream signals received to the first and second base station receivers 661 and 662 from the base station donor 640 are input to the TDD/FDD modem 601 of the BS 600.

The signals are delivered to the TDD/FDD mode control signal unit 603 of the base station donor 640 through the TDD/FDD modem controller 602, and mode control signals of an HD transmission scheme are generated. In addition, the TDD switching control signal unit 604 outputs TDD switching control signals for switching the TDD sync signals at predetermined times, according to the generated HD mode. Then, downstream signals output from the TDD/FDD mode control signal unit 603 and the TDD switching control signal unit 604 are combined and transmitted to the downstream optical transmitter 606. Then, the TDD/FDD downstream RF signals, modulated and channel-combined by the TDD/FDD modem 601 of the BS 600, are received in the downstream optical transmitter 613 through the downstream RF transmitter 611. The received downstream RF signals together with downstream signals output from the TDD/FDD mode control signal unit 603 and the TDD switching control signal unit 604, are transmitted to the RS 645. The HD downstream signals delivered to the RS 645 are low noise-amplified by the LNA 617 and are high power-amplified by the High Power Amplifier (HPA) 618. Therefore, the HD service including the TDD and FDD services is provided to wireless terminals via the RF duplexer #1 620 and the antenna 621.

Figure 7:
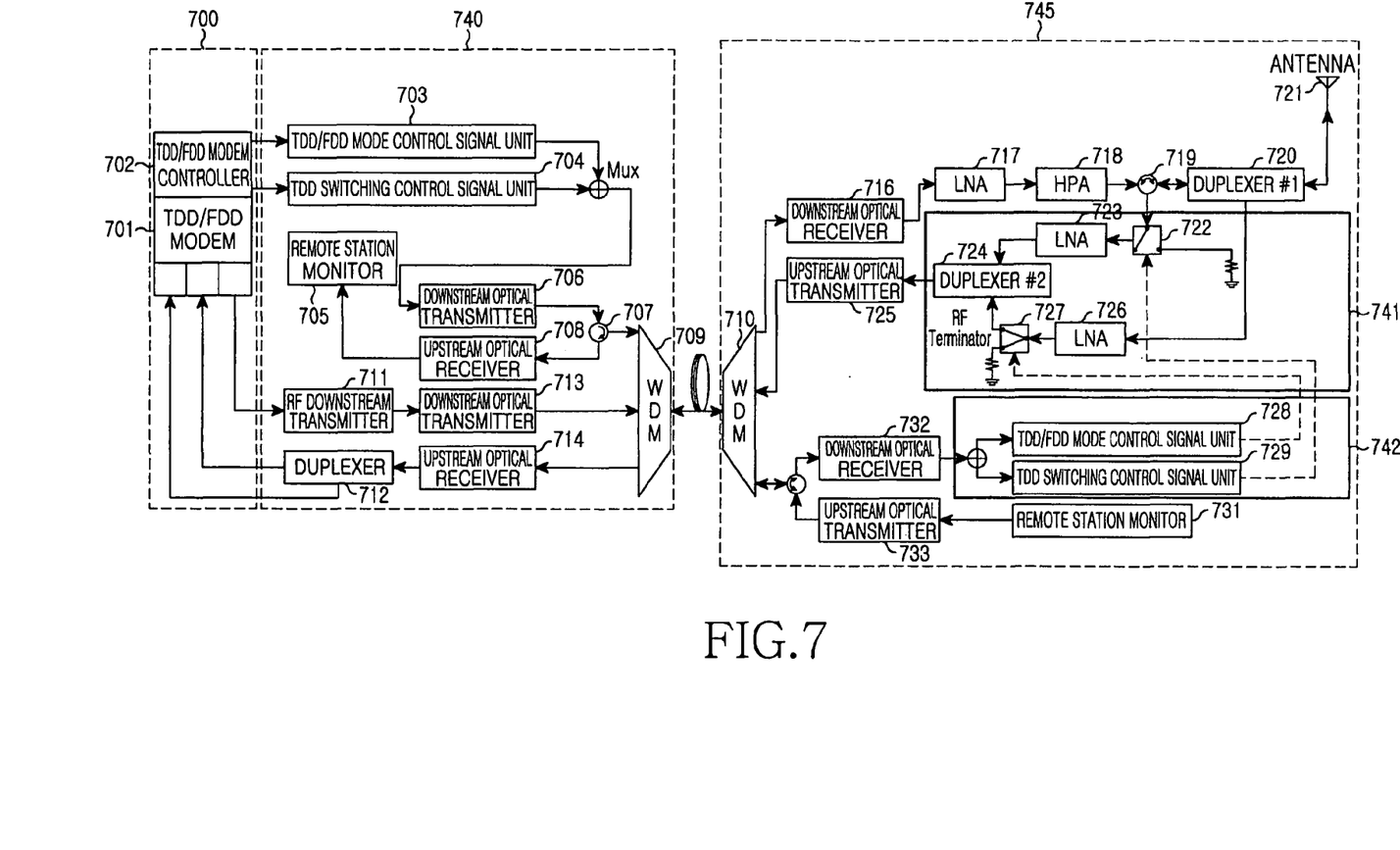
FIG. 7 is a block diagram illustrating a construction of a wireless communication system operating in a TDD mode, according to a second embodiment of the present invention.

FIG. 7 is a block diagram illustrating a construction of a wireless communication system operating in a TDD mode, according to a second embodiment of the present invention. Referring to FIG. 7, in a case where upstream signals received from wireless terminals through an antenna 721 of the RS 745 are TDD mode upstream signals, when the TDD upstream signals are input to a switching unit 722 through an RF duplexer #1 720 after the direction-adjustment of the circulator 719, the switching unit 722 is connected to a corresponding path of the TDD upstream signals according to the control of the TDD switching control signal unit 729. Then, the resultant signals are input to an LNA #1 723, so that weak signals are low noise-amplified. In this case, the switching of the FDD upstream signal path is grounded by an RF terminator.

Moreover, the low noise-amplified TDD upstream signals are input to the base station donor 740 via a duplexer #2 724 and an upstream optical transmitter 725. The TDD upstream signals received from the RS 745 through an upstream optical link are input to an upstream optical receiver 714, and are delivered to the first base station receiver 761 from the duplexer 712 through the first upstream RF receiver.

Meanwhile, TDD/FDD mode control signals are delivered to a TDD/FDD mode control signal unit 703 of the base station donor 740 by a TDD/FDD modem controller 702.

Moreover, the TDD switching control signal unit 704 outputs a TDD switching control signal for performing the switching at predetermined times depending on the TDD sync signals. Then, downstream signals output from the TDD/FDD mode control signal unit 703 and the TDD switching control signal unit 704 are combined, and are transmitted to the RS 745 through a downstream optical transmitter 706. The TDD/FDD downstream RF signals modulated and channel-combined by the TDD/FDD modem 701 of the BS 700 are generated in a base station transmitter, and are input to a downstream optical transmitter 713 thorough a downstream RF transmitter 711. Then, the resultant signals together with the multiplexed downstream signals output from the TDD/FDD mode control signal unit 703 and the TDD switching control unit 704, are transmitted to the RS 745. The TDD downstream signals delivered to the RS 745 are low noise-amplified by an LNA 717, and are high power-amplified by an HPA 718. Therefore, the TDD transmission service is provided to wireless terminals through the RF duplexer #1 720 and the antenna 721.

Figure 8:
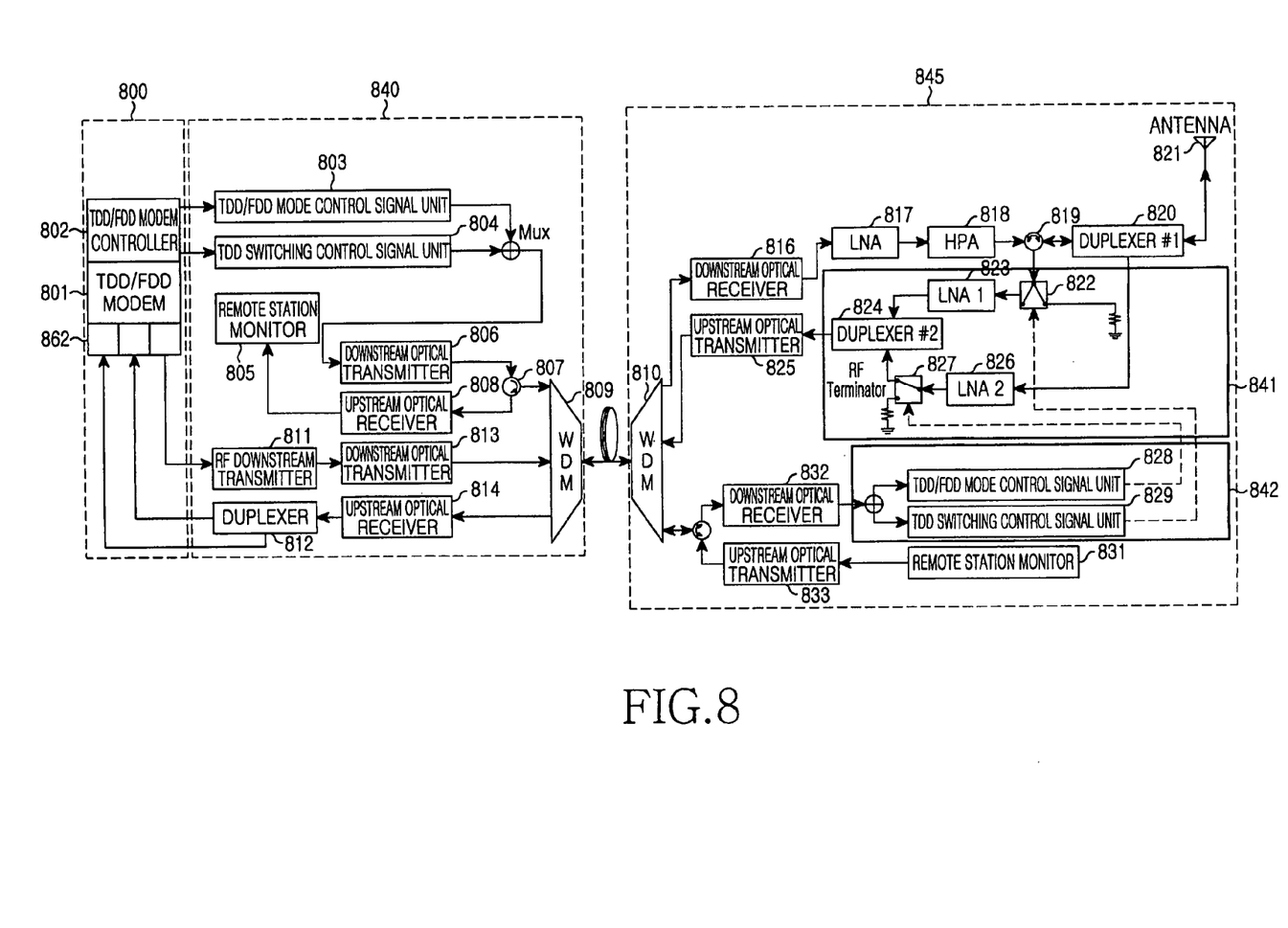
FIG. 8 is a block diagram illustrating a construction of a wireless communication system operating in an FDD mode, according to a third embodiment of the present invention.

FIG. 8 is a block diagram illustrating a construction of a wireless communication system operating in an FDD mode, according to a third embodiment of the present invention. Referring to FIG. 8, when upstream signals received from wireless terminals through an antenna 821 of the RS 845 are FDD mode upstream signals, the FDD upstream signals are low-noise amplified by an LNA #2 826 through an RF duplexer #1 820, and the resultant signals are connected to the second duplexer 824 according to the control of the TDD/FDD mode control signal unit 828. In this case, a first RF switch 822 of a TDD upstream signal path is grounded by an RF terminator under the control of the TDD switching control signal unit 829.

Then, the FDD upstream signals are delivered to the base station donor 840 via an RF duplexer #2 824 and an upstream optical transmitter 825. The FDD upstream signals received from the RS 845 through an upstream optical link are input to an upstream optical receiver 814, and are divided according to frequencies by the duplexer 812. Then, the divided signals are delivered to a second base station receiver 862 of the base station 800 through an FDD RF upstream signal unit 2.

Meanwhile, TDD/FDD mode control signals are delivered to the TDD/FDD mode control signal unit 803 of the base station donor 840 from the TDD/FDD modem controller 802.

Moreover, in order to control the RF switch within the RS 845 according to the generated FDD operation mode, the TDD switching control signal unit 804 outputs the TDD switching signals for switching the TDD sync signals at predetermined times. The downstream signals output from the TDD/FDD mode control signal unit 803 and the TDD switching control signal unit 804 are multiplexed, and then transmitted to the downstream optical transmitter 806. The FDD downstream RF signals modulated and channel-combined by the TDD/FDD modem 801 of the BS 800 are input to downstream optical transmitter 813 through the base station transmitter and the downstream RF transmitter 811. The input signals together with the multiplexed downstream signals, output from the TDD/FDD mode control signal unit 803 and the TDD switching control signal unit 804, are transmitted to the RS 845. The FDD mode downstream signals delivered to the RS 845 are low noise-amplified by the LNA 817 and are high power-amplified by an HPA 818. Therefore, the FDD transmission service is provided to wireless terminals through an RF duplexer 820 and an antenna 821.

Figure 9:
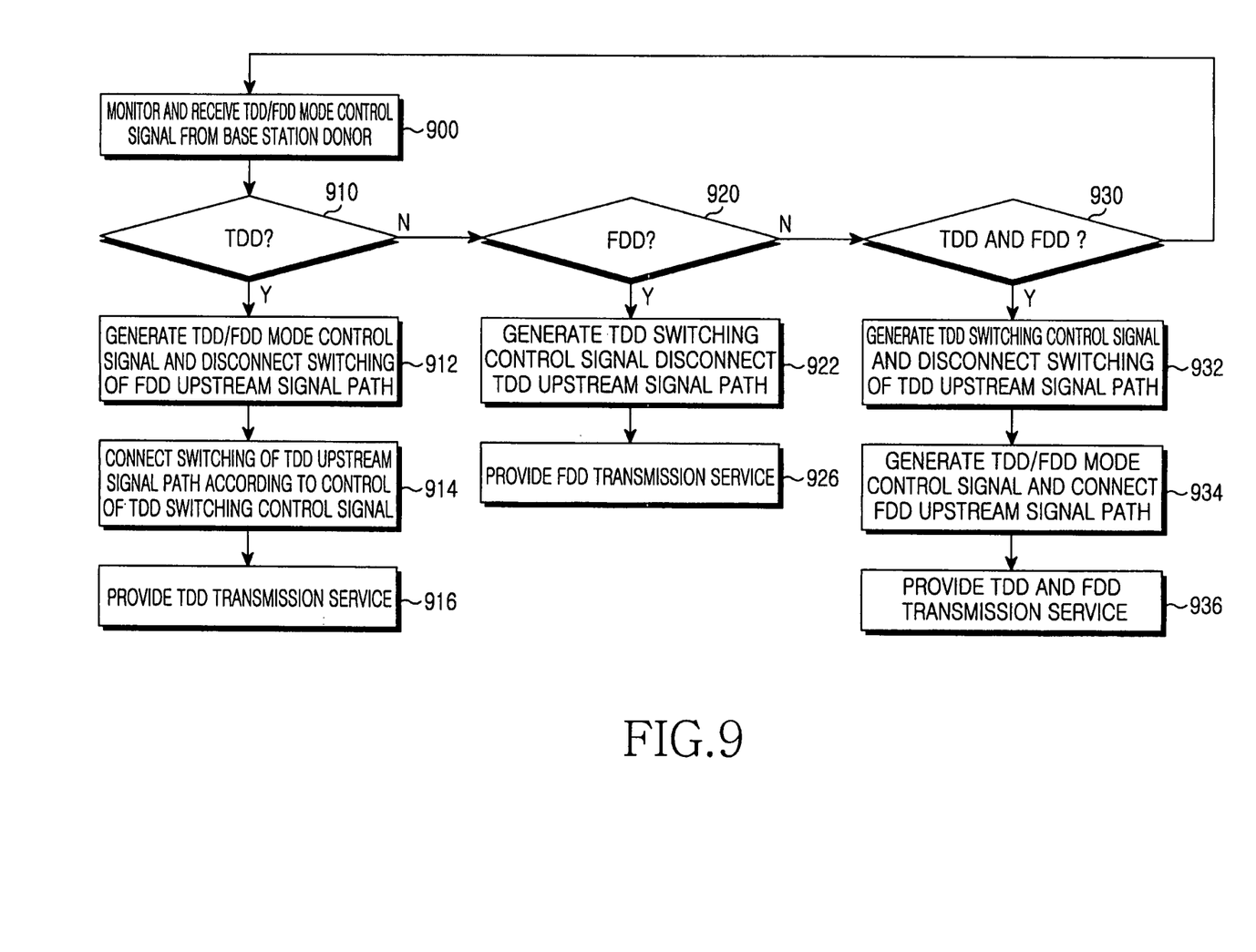
FIG. 9 is a flow diagram illustrating a signal control method in an RoF system providing an HD wireless communication service according to the present invention.

FIG. 9 is a flow diagram illustrating a signal control method in a radio-over-fiber (RoF) system providing an HD wireless communication service according to the present invention. In the signal control method of an HD RoF system providing a wireless communication service according to the present invention, the RoF system includes a BS and an RS capable of establishing communication with wireless terminals. In the wire/wireless communication method, the BS can provide an individual scheme of a TDD transmission scheme and an FDD transmission scheme or a combined HD transmission scheme thereof according to positions and states of wireless terminals, wherein the wire/wireless communication system includes a BS and an RS capable of establishing communication with wireless terminals. First, the RS receives the TDD/FDD mode control signals and the TDD switching control signals from the base station modem controller through the base station donor (step 900).

When TDD upstream signals are received in the step 900, the switching of the FDD upstream signal path is disconnected according to the control of the TDD/FDD mode control signal unit 728 (steps 910 and 912). The TDD upstream RF signals are connected to the TDD upstream signal path by performing the switching according to the control of the TDD switching control signal unit 729 (step 914). Then, the resultant signals are delivered to the BS 700 via the base station donor 740 and an upstream optical link. Therefore, the TDD transmission service is provided to the wireless terminals according to the operation of the TDD/FDD modem of the BS 700 (step 916).

Moreover, when the FDD upstream signals are received in step 900, the switching of the FDD upstream signal path is connected according to the control of the TDD/FDD mode control signal unit 828 (step 920). The switching of the TDD upstream signal path is disconnected according to the control of the TDD switching control signal unit 829 (step 922). Then, the FDD upstream signals are delivered to the BS 800 via the base station donor 840 and an upstream optical link. Therefore, the FDD transmission service is provided to the wireless terminals according to an operation of the TDD/FDD modem of the BS 800 (step 926).

Furthermore, when the TDD/FDD duplexing mode upstream signals are received in step 900, the switching of the FDD upstream signal path is connected according to the control of the TDD/FDD mode control signal unit 628 (step 934). The switching of the TDD upstream signal path is also connected according to the control of the TDD switching control signal unit 629 (step 932). Each of the TDD/FDD upstream signals is delivered to the BS 600 via the base station donor 640 and an upstream optical link. Therefore, the TDD/FDD hybrid mode transmission service is provided to the wireless terminals according to an operation of the TDD/FDD modem 601 and the modem controller 602 within the BS 600 (step 936).

According to one embodiment of the present invention, it is possible to provide an RoF system capable of providing an HD wireless communication service and achieve a construction and an operation of a signal control method for the same.

Although the present disclosure has been described with an exemplary embodiment, various changes and modifications may be suggested to one skilled in the art. It is intented that the present disclosure encompass such changes and modifications as fall within the scope of the appended claims.

What is claimed is:

1. A Radio over Fiber (RoF) system for providing a Hybrid Duplexing (HD) wireless communication service in a wire/wireless communication system including a base station capable of establishing communication with wireless terminals and a remote station connected to the base station through an optical fiber, wherein the base station can provide a Time Division Duplexing (TDD) service and a Frequency Division Duplexing (FDD) service according to wireless service channel states of the wireless terminals, the RoF system comprising:

the base station for transmitting and receiving each of the TDD/FDD individual signals and TDD/FDD combined signals, channel-combining downstream signals for a TDD scheme with downstream signals for an FDD scheme, and generating TDD/FDD mode control signals;

a base station donor for receiving downstream RF signals from the base station, converting the resultant signals into downstream optical signals, outputting the converted signals, and delivering upstream optical signals, which are input to the remote station from the wireless terminals, to the base station; and the remote station for switching a corresponding duplexing mode operation according to wireless service channel states of the wireless terminals, converting the downstream optical signals transmitted from the base station donor into service RF signals, amplifying the converted service RF signals, and providing the amplified service RF signals to the wireless terminals through antennas.

2. The RoF system as claimed in claim 1, further comprising an upstream optical link for connecting the remote station with the base station donor for upstream data transmission, and a downstream optical link for connecting the remote station and the base station donor for downstream data transmission.

3. The RoF system as claimed in claim 1, wherein the base station comprises:

a TDD/FDD modem for performing modulation, demodulation and channel-combination for a TDD/FDD service; and a TDD/FDD modem controller for controlling a TDD/FDD mode signal operation by using TDD/FDD downstream signals combined in the TDD/FDD modem.

4. The RoF system as claimed in one of claims 1 and 3, wherein the mode control signals correspond to TDD mode control signals, FDD mode control signals, or mode control signals including combined TDD and FDD mode.

5. The RoF system as claimed in claim 1, wherein the base station donor comprises:

a TDD/FDD mode control signal unit for receiving the downstream signals from the base station and outputting TDD/FDD mode control signals for setting a TDD/FDD mode;

a TDD switching control signal unit for outputting TDD switching control signals for switching TDD sync signals delivered from the base station;

a combiner for multiplexing and outputting signals, output from each of the TDD/FDD mode control signal unit and the TDD switching control signal unit;

a TDD/FDD mode control signal downstream optical transmitter for receiving the multiplexed downstream RF signals output from the combiner, converting the multiplexed downstream RF signals into optical signals, and outputting the converted signals; and a Wavelength Division Multiplexer (WDM) for outputting multiple upstream/downstream signals, input and output from the uplink/downlink, to a single optical fiber or multiple optical fibers.

6. The RoF system as claimed in claim 5, wherein the base station donor further comprises:

an upstream optical receiver for receiving and outputting the upstream optical signals, input from the WDM;

a duplexer for dividing upstream RF signals with different frequency bandwidths, output from the upstream optical receiver, according to frequencies, and distributing the divided signals to each corresponding base station receiver;

first and second upstream RF receivers for low noise-amplifying the upstream RF signals transmitted from the duplexer, and delivering the amplified upstream RF signals to the first and second receivers of the base station;

a remote station monitor for monitoring information regarding the remote station state;

a downstream RF transmitter for properly amplifying the downstream RF signals transmitted from the base station transmitter of the base station, and delivering the amplified downstream RF signals to an optical transmitter; and a downstream optical transmitter for converting the TDD/FDD mode control signals for the TDD/FDD combined service, which are received from the base station modem controller of the base station, into optical signals in order to transmit the TDD/FDD mode control signals to the remote station.

7. The RoF system as claimed in claim 1, wherein the remote station comprises:

a WDM for outputting multiple upstream/downstream signals, which are input and output from the uplink/downlink, to a single optical fiber or multiple optical fibers;

a downstream optical receiver for receiving downstream optical signals from the WDM;

an amplifier for receiving signals from the downstream optical receiver and low-noise highpower amplifying the received signals;

a duplexer for dividing upstream signals, delivered from the wireless terminals through the antenna, according to frequencies, and outputting the divided upstream signals;

a processor for distributing the upstream signals received from the duplexer to a corresponding path according to a transmission scheme, and outputting the upstream signals under the control of the switching;

an upstream optical transmitter for receiving upstream signals output from the processor, and delivering the received upstream signals to the WDM;

a downstream optical receiver for receiving TDD/FDD mode control signals and TDD switching control signals from the base station through the WDM, and outputting the received signals;

a signal divider for de-multiplexing downstream signals output from the downstream optical receiver and separately outputting the de-multiplexed downstream signals;

a controller for controlling the processor operation by outputting the TDD/FDD mode control signals and the TDD switching control signals which are output from the divider;

a remote station monitor for monitoring and outputting a state of the remote station; and an upstream optical transmitter for receiving information regarding the remote station state output from the remote station monitor, and transmitting the received information to the WDM.

8. The RoF system as claimed in claim 1, wherein the base station further comprises:

a base station transmitter for transmitting the downstream RF signals, modulated from the TDD/FDD modem, to the base station donor;

a first base station receiver for receiving the TDD mode upstream RF signals received from the base station donor; and a second base station receiver for receiving the FDD mode upstream RF signals received from the base station donor.

9. The RoF system as claimed in claim 7, wherein the downstream RF signals correspond to one of TDD mode downstream RF signals or FDD mode downstream RF signals.

10. The RoF system as claimed in claim 7, wherein the processor comprises:

first and second switching units for connecting or disconnecting upstream signal paths of the wireless terminals;

first and second low noise-amplifiers for removing upstream signal noise and amplifying the resultant signals; and first and second duplexers for dividing and outputting upstream signal, transmitted from the first and second low noise-amplifiers, according to frequencies.

11. The RoF system as claimed in claim 7, wherein the controller comprises:

a TDD/FDD mode control signal unit for controlling the processor switching by generating the TDD/FDD mode control signals; and a TDD switching control signal unit for outputting TDD switching control signals for switching the TDD sync signals.

12. A signal transmission control method in a wire/wireless communication system including a base station capable of establishing communication with wireless terminals, a base station donor, and a remote station connected to the base station donor through optical fibers, wherein the base station can provide a TDD transmission service and an FDD transmission service according to wireless service channel states of the wireless terminals, the signal transmission control method comprising the steps of:

disconnecting switching of FDD upstream signal paths according to the control of TDD/FDD mode control signals of the remote station, and connecting switching of TDD upstream signal paths according to the control of TDD switching control signals of the remote station, when TDD upstream signals are received from the wireless terminals through an antenna of the remote station; and delivering the TDD upstream signals, passed through the TDD upstream signal paths, to a first base station receiver of the base station via the base station donor and upstream optical links.

13. The signal transmission control method as claimed in claim 12, further comprising the steps of:
   connecting the switching of FDD upstream signal paths according to the control of TDD/FDD mode control signals of the remote station, and disconnecting the switching of TDD upstream signal paths according to the control of TDD switching control signals of the remote station, when FDD upstream signals are received from the wireless terminals through the antenna of the remote station; and
   delivering the FDD upstream signals, passed through the FDD upstream signal paths, to the second base station receiver of the base station via the base station donor and upstream optical links.

14. The signal transmission control method as claimed in claim 12, further comprising the steps of:
   connecting the switching of FDD upstream signal path according to the control of TDD/FDD mode control signals of the remote station, and connecting the switching of TDD upstream signal paths according to the control of the TDD switching control signals of the remote station, when TDD/FDD upstream signals are received from the wireless terminals through the antenna of the remote station; and
   delivering TDD/FDD upstream signals, passed through each of the TDD/FDD upstream signal paths, to the first and second base station receivers of the base station via the base station donor and upstream optical links.

15. A wireless network for providing hybrid duplexing wireless service, the wireless network comprising:
   a plurality of base stations, each base station comprising a base station donor, the base station donor connected to a remote station through optical fibers,
   wherein each of the base stations is configured to communicate with each of a plurality of wireless terminals using each of a plurality of mode control signals, the mode control signals comprising: i) mode control signals of a time division duplexing (TDD) scheme; ii) mode control signals of a frequency division duplexing (FDD) scheme; and iii) mode control signals of a Hybrid Duplexing transmission scheme resulting from a combination of the TDD and FDD transmission schemes,
   wherein each of the base stations is configured to disconnect switching of FDD upstream signal paths according to the control of Hybrid Duplexing mode control signals of the remote station, and connect switching of TDD upstream signal paths according to the control of TDD switching control signals of the remote station, when TDD upstream signals are received from the wireless terminals through an antenna of the remote station.

16. The wireless network as set forth in claim 15, wherein the each base station selects one of the mode control signals to communicate with a first one of the plurality of wireless terminals according to a state of a wireless channel associated with the first wireless terminal.

17. The wireless network as set forth in claim 16, wherein the state of the wireless channel associated with the first wireless terminal is determined by a distance separating the each base station and the first wireless terminal and by a velocity of the first wireless terminal.

18. The wireless network as set forth in claim 16, wherein the each base station communicates with the plurality of mobile terminals using two frequency bandwidths, wherein a first frequency bandwidth is used for TDD service and a second frequency bandwidth is used for FDD service.

19. The wireless network as set forth in claim 18, wherein the first frequency bandwidth used for TDD service comprises a TDD uplink channel and a TDD downlink channel.

20. The wireless network as set forth in claim 18, wherein the second frequency bandwidth used for FDD service comprises an FDD uplink channel.

* * * * *